Oct. 21, 1924.  1,512,824
H. J. J. M. DE R. DE BELLESCIZE
WIRELESS TELEGRAPH AND TELEPHONE RECEIVER
Filed Aug. 29, 1921

Inventor
H.J.J.M.DeR.De BELLESCIZE
By his Attorney

Patented Oct. 21, 1924.

1,512,824

UNITED STATES PATENT OFFICE.

HENRI JEAN JOSEPH MARIE DE REGNAULD DE BELLESCIZE, OF PARIS, FRANCE.

WIRELESS TELEGRAPH AND TELEPHONE RECEIVER.

Application filed August 29, 1921. Serial No. 496,534.

(GRANTED UNDER THE PROVISIONS OF THE ACT OF MARCH 3, 1921, 41 STAT. L., 1313.)

*To all whom it may concern:*

Be it known that I, HENRI JEAN JOSEPH MARIE DE REGNAULD DE BELLESCIZE, a citizen of France, and a resident of Paris, France, have invented certain new and useful Improvements in Wireless Telegraph and Telephone Receivers (for which I have filed application in France Oct. 10, 1919, Patent No. 504,783), of which the following is a specification, accompanied by drawings.

The object of the invention is to provide an arrangement for protecting wireless telephone and telegraph receivers from damped statics or strays; the arrangement is of the well-known differential type equipped with two opposing resonators. It is substantially characterized by the fact that it is arranged on the low frequency circuit of the receiver and that it does not require any additional detector.

Several arrangements for protecting wireless telephone and telegraph receivers from damped statics, especially of atmospheric and telluric origin, are based on the well-known differential arrangement in which an indicator is actuated by two separate circuits; these two circuits are laid out in such a manner as to react differently in respect to slightly damped or undamped periodic waves, and to react equally in respect to a highly damped or aperiodic static or stray. In this manner the actions of the two differential circuits on the common indicator oppose each other if they originate from statics, and give rise to a resultant, different from zero, if they originate from the signal to be received.

For the two opposite circuits to react differently in respect to the same signal it is necessary for them to differ in at least one of their characteristics: directional characteristics, wherever two directional aerials are used, periods, damping or time constants. The arrangement which is the subject matter of this invention refers to receivers equipped with a single aerial and is to be classed among such devices as are based on the mutual opposition of two resonators having different periods.

Now wherever aperiodic static acts on a resonator of a certain period it gives rise, as a rule, to a complex vibration arising from the superposition of a current of a shape similar or identical to the wave form of the static and of a free oscillation having the resonator's own frequency and damping. Consequently static acting on a differential system made up of two resonators having different periods and different damping gives rise, as a rule, to free oscillations differing likewise as to their periods or as to their damping; the shapes and the instantaneous values of these two oscillations are not therefore identical at all times, and it will be, as a rule, impossible to balance efficiently these instantaneous intensities against each other on an indicator in such a manner that they counteract each other. It has therefore been necessary in all devices of this type heretofore in use, to insert between each of the resonators constituting the differential system and the common indicator, a detector rectifying the free oscillations. There are therefore being opposed against each other two rectified currents either directly or through their mechanical effects.

Figure 1:
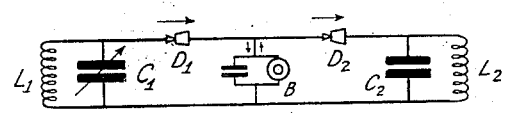
Fig. 1 shows an ordinary arrangement with two detectors for the protecting device.

The essential members of these devices are shown in the general diagram of Fig. 1. $L_1$ $C_1$ and $L_2$, $C_2$, are the two resonators, open aerials or closed circuits; $D_1$ and $D_2$ two separate identical detectors; B an indicator on which the rectified currents shown by the arrows act in inverse directions.

The presence of two detectors $D_1$ and $D_2$ brings about several almost insurmountable difficulties. It is difficult to obtain two identical detectors and to keep them identical while in operation; furthermore for the arrangement shown in Fig. 1 to be fully efficient it is necessary for the current rectified by the detector to be proportional to the amplitude of the oscillation from which it is originated, a requirement which is never fulfilled unless by artificial means giving rise to further troubles.

The object of this invention is to eliminate the detectors inserted between the two resonators or differential sets of resonators and the common indicator.

The suggested arrangement is based on the following principle: If a sufficiently rapidly oscillating aperiodic static is caused to act on an electrical resonator having a certain comparatively high frequency, the free oscillations originating have but a very small amplitude and may be disregarded, so that the resonator becomes the seat of a current, the shape of which is a faithful reproduction of the shape of the static. In other words, the latter travels without any appreciable deformation along the circuit; this result is attained the more completely the greater the resonator's own period T is in reference to the time constants characterizing the static.

The shape and the duration of a disturbance being unknown elements, they cannot be taken as starting points; on the other hand, the resulting current (after its going through the aerial, the receiving circuits and the receiver which are the customary arrangement) has a shape and time constants thoroughly identified by the electrical characteristics of the circuits. Likewise the musical note of a signal is as a rule adjusted by the operator and may be rendered sufficiently low for the period corresponding to this note to be considerably greater than the time constants of the current originated by a disturbance or static after its passage through the detector.

One of the essential features of this device is that it is arranged on the low frequency circuit of the receiver, namely in the path of the current rectified by the detector, which detector is found in all ordinary systems.

The receiver (Fig. 2) includes all the standard parts: aerial A, intermediate circuits R, amplifier, etc., as to which there is no special requirement. Detector D is still an essential part but it is not a feature of this invention.

The amplitude of the current originated from the signal to be received should, after it has been rectified by the detector, present a rhythmical or undulated shape with musical frequency. Among the numerous arrangements in use, those allowing this result to be attained at the receiving station itself are more convenient but by no means essential. We shall point out as thoroughly suitable a heterodyne or an autodyne arrangement.

To these standard receiving devices there is added the following special device: Circuit XY travelled by the musical current (harmonic current) originating from detector D excites two different low frequency resonators $L_1 C_1$ and $L_2 C_2$ having different periods $T_1 T_2$ of their own, one of these periods being tuned to the musical frequency of the signal to be received.

The two low frequency resonators act in opposite directions, without the insertion of any additional detector, on the same indicator B, which may be a telephone. By the words "in opposite directions" there is meant the fact that an aperiodical disturbance or static gives rise after its having gone through the two low frequency resonators to two opposite instantaneous currents across the indicator; in practice, in case of doubt this result is realized by finding out for instance which is the relative direction of $M_1$ and $M_2$ giving acoustically the greatest weakening of the disturbance.

Figure 2:
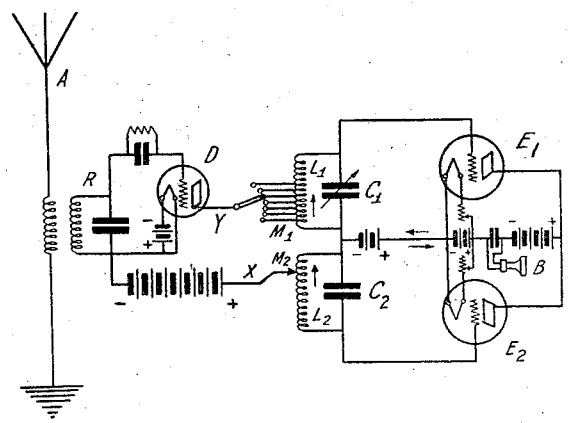
Fig. 2 shows an arrangement according to this invention.

Lamps $E_1$ and $E_2$ shown on Fig. 2 are mere relays transmitting to the indicator without deformation the currents issuing from resonators $L_1 C_1$ and $L_2 C_2$; these lamps are not essential in the arrangement but they are useful for its good operation; they avoid indicator B bringing about an appreciable connection between the two resonators.

In practice, provision is made for capacities $C_1$ and $C_2$ and periods $T_1$ and $T_2$ of the two resonators to be sufficiently large for the statics to travel through them without giving rise to any noticeable musical oscillation, a fact which may be ascertained acoustically; in practice with medium waves and standard receivers the values of $$T_1 = 2\pi\sqrt{L_1 C_1} \text{ and } T_2 = 2\pi\sqrt{L_2 C_2}$$

may be of the order of 1/300th of a second. It is furthermore advisable to have one, at least, of condensers $C_1$ and $C_2$ under the control of the operator; in Fig. 2 condenser $C_1$ is shown as adjustable.

An adjusting arrangement is necessary to equalize the action of the two resonators on indicator B; $M_1$ of Fig. 2 may be adjusted by means of a switch arrangement, but the same result may be attained in different manners for instance by adjusting the sensitiveness of one of the lamps of the relay.

Having described my invention what I claim is:—

1. In a wireless telegraph receiver, a detector, means for impressing signals having tone characteristics on said detector, a pair of circuits tuned to slightly different tone frequencies and provided with means to prevent interchange of energy therebetween, a circuit connected between the detector and said pair of circuits, said circuit being coupled to each of the tone frequency circuits and an indicator connected to both tone frequency circuits with their effects in opposition thereon.

2. In a wireless telegraph receiver, a detector, means for impressing signals having tone characteristics on said detector, a pair of circuits tuned to slightly different tone frequencies and provided with means to prevent interchange of energy therebetween, one of which corresponds to the frequency of said tone, a circuit connected between the detector and said pair of circuits, said circuit being coupled to each of the tone frequency circuits and an indicator connected to both tone frequency circuits with their effects in opposition thereon.

3. In a wireless telegraph receiver, a detector, means for impressing signals having tone characteristics on said detector, a pair of circuits tuned to slightly different tone frequencies and provided with means to prevent interchange of energy therebetween, a circuit connected between the detector and said pair of circuits, said circuit being coupled to each of the tone frequency circuits, an indicator connected to both of the tone frequency circuits with their effects in opposition thereon and means for adjusting the effect on said indicator of one of said tone frequency circuits.

4. In a wireless telegraph receiver, an antenna, a detector, means co-operating with said antenna for impressing signals having tone characteristics on said detector, a pair of circuits tuned to slightly different tone frequencies and provided with means to prevent interchange of energy therebetween, a circuit connected between the detector and said pair of circuits, said circuit being coupled to each of the tone frequency circuits and an indicator connected to both tone frequency circuits with their effects in opposition thereon.

HENRI JEAN JOSEPH MARIE
de REGNAULD de BELLESCIZE.